US009378292B2

(12) United States Patent
Rasmussen

(10) Patent No.: US 9,378,292 B2
(45) Date of Patent: Jun. 28, 2016

(54) SUPPORT FOR MULTIPLE COMPONENT EDITIONS

(75) Inventor: Glenn Rasmussen, Nepean, CA (US)

(73) Assignee: INTERNATIONAL BUSINESS MACHINES CORPORATION, Armonk, NY (US)

(*) Notice: Subject to any disclaimer, the term of this patent is extended or adjusted under 35 U.S.C. 154(b) by 1821 days.

(21) Appl. No.: 12/478,891

(22) Filed: Jun. 5, 2009

(65) Prior Publication Data
US 2009/0307709 A1 Dec. 10, 2009

Related U.S. Application Data

(60) Provisional application No. 61/059,507, filed on Jun. 6, 2008.

(51) Int. Cl.
G06F 15/173 (2006.01)
G06F 17/30 (2006.01)

(52) U.S. Cl.
CPC ...... *G06F 17/30887* (2013.01); *G06F 17/3089* (2013.01)

(58) Field of Classification Search
CPC .................. G06F 17/30887; G06F 17/3089
USPC .................... 709/203, 223; 719/311
See application file for complete search history.

(56) References Cited

U.S. PATENT DOCUMENTS

| 6,279,030 | B1* | 8/2001 | Britton ........... G06F 9/44521 707/999.01 |
| 6,965,938 | B1* | 11/2005 | Beasley et al. ........... 709/229 |
| 7,269,648 | B1* | 9/2007 | Krishnan ........ G06F 17/30575 707/E17.032 |
| 2002/0104097 | A1* | 8/2002 | Jerding ............. G06F 8/60 725/115 |
| 2004/0107423 | A1* | 6/2004 | Noda ........................ 719/311 |
| 2009/0157859 | A1* | 6/2009 | Morris ..................... 709/223 |
| 2012/0036239 | A1* | 2/2012 | Donaghey .......... G06F 9/44563 709/221 |

OTHER PUBLICATIONS

Moodle01; "Run multiple instances of Moodle without duplicating base code?", forum posts from Sep. 29, 2004 through Jan. 23, 2008; moodle.org; pp. 1-18; retrieved from http://moodle.org/mod/forum/discuss.php?d=13211 on Apr. 19, 2012.*
Spring01; "Spring Application Framework v2.0.8"; Jan. 9, 2008; Spring Source Community; www.springsource.org; v2.0.8; pp. 1-502.*

* cited by examiner

*Primary Examiner* — Oleg Survillo
(74) *Attorney, Agent, or Firm* — Ryan Lewis; SVL IPLaw Edell, Shapiro & Finnan, LLC

(57) ABSTRACT

A system and method for generating an object request comprising an absolute address from a relative address in a system comprising a plurality of editions of components for processing said object, said object request being generated by a request building component is described. To generate the object request, an edition of a component associated with processing the object is determined. The component edition is used to determine a specified address which is used in constructing the absolute address of the generated object request.

20 Claims, 6 Drawing Sheets

SUPPORT FOR MULTIPLE COMPONENT EDITIONS

CROSS REFERENCE TO RELATED APPLICATIONS

The present application claims priority of U.S. provisional patent application No. 61/059,507, filed Jun. 6, 2008 and entitled "Support for Multiple Component Versions", the contents of which are incorporated herein by reference in their entirety.

BACKGROUND

Businesses and corporations are increasingly providing access to internal resources over a network. Often, a client is provided that communicates with a backend server over a network to access resources. For example, a client or requester agent may communicate with a web server using Hyper Text Transport Protocol (HTTP). The client sends requests that contain an address, such as a Universal Resource Locator (URL), or more generally a Universal Resource Identifier (URI), of a subject resource that can be manipulated by the web server. The URI may refer to static content, such as a static web page or graphic. In these cases, the web server can return the resource to the client. The request may also refer to dynamic content that requires the web server to generate the content in some manner. These requests for dynamic content may require processing by other resources. These requests may be routed to an external program for processing, for example, through a Common Gateway Interface (CGI). How the resource addresses of requests are mapped to the static content, such as files, or the dynamic content such as CGI programs, is defined by the web server configuration. Web servers may also provide other interfaces to external applications to improve the performance of the web server and/or the external program.

The web server may include a gateway that forwards requests for dynamic content to an application server for processing. The application server may receive the request and forward it to a servlet for processing. The application server, which may be implemented as a servlet container, may pass the request to specific servlets based on the URI of the request. For example, a client such as a web browser may send an HTTP GET request to http://example.com/servlets/server1. The web server receives the request and, based on the configuration of the web server, determines that the request should be forwarded to an application server. The application server may pass the request to the server 1 servlet, which processes the request and returns a response.

An object resource such as a static HTML page, or dynamic content provided by a servlet, may address other object resources. For example, an HTML page may refer to a graphic that is rendered on the page in the client's browser. A servlet may refer to another servlet or other content. The addresses used to identify the resources may be an absolute URI or a relative URI. An absolute URI specifies the full address of the resource. A relative URI specifies only a partial address of the resource. The address of the referencing resource, such as the HTML page, is used to construct the absolute URI of the required resource. Using relative addresses allows flexibility in deploying resources of a system. The location of resources may be changed as long as it is in the same relative location to the referencing resources.

A servlet may retrieve application content based on the request, such as, report definitions for describing a report to run against a database. The application content may be stored in a content store. The content store may be a relational database. These report definitions may be used to generate reports by accessing data stores, which may be, for example, relational databases or OLAP cubes. The data stores typically store the businesses' or corporations' information. For example, if the report definition retrieved from the content store describes a sales report, it may access the data stores to retrieve the required sales information.

A servlet may also provide a User Interface (UI) for various functions, such as, the functionality provided by other servlets or components. Servlets that provide a unified point of access to various functionality or information may be referred to as a portal. A portal may construct a UI that includes links to the functionality or resources that are available to the user. When a user clicks on a link of the UI, the particular resource is requested.

The servlet framework may be extended to provide additional functionality. Servlets may be organized into server groups in order to process requests efficiently, or to identify servlets that can access particular resources. Servlets may also be grouped into server groups to support charge-back accounting, allowing a group to pay for the cycles they use on dedicated hardware. For example, a human resources (HR) database may only be available on a limited number of machines. When a servlet receives a request that requires accessing the HR database, it will be forwarded to a servlet in the correct server group, i.e., the server group that has access to the HR database, for processing. Alternatively, the request may be received at the correct server group, in which case the request is processed. The correct server group to process a request may be determined based on user information of the client sending the request, an object of the request, a component used to process the request and configuration information. For example, a request may be received from a user in the HR department. The request may run a report for the user, which is run by a reporting component. An administrator may have provided configuration information, possibly in a database, that specifies a particular server group to use when a user of the human resources department requires using the reporting component.

When migrating from one edition of an application to a new edition, it may be necessary to create a multiple edition environment in which both editions are present. FIG. 1 depicts an exemplary multiple edition environment. In the multiple edition environment 100, two complete implementations co-exist in a side-by-side arrangement. The components of each of the implementations are indicated as being either edition N-1 or N. The environment 100 includes clients 102, 104 that access a web server 106. The web server 106 includes static content 108 for the N-1 edition and static content 110 for the N edition. The web server also includes an N-1 Gateway 112 and an N Gateway 114. The environment 100 further includes two application servers 116, 122, which each include servlets. The application server 116 includes an N-1 servlet 118 and an N servlet 120. The N-1 gateway 112 provides access to the N-1 servlet 118 to clients 102, 104. The N gateway 114 provides access to the N servlet 120 to clients 102, 104. Application server 122 includes an N-1 servlet 124 and an N servlet 126. Servlets can pass requests to other servlets, as indicated by arrow 128. The two editions (i.e., N and N-1) may share a common content store 130 and may access the same data stores 132, 134. The application servers 116, 122 may be provided on a single physical computer or on multiple physical computers. The gateways, services and content manager may be implemented as servlets or servlet modules in a servlet framework. The servlet framework may be a servlet container, such as an Apache TomCat container.

In a multiple edition environment 100 as described above, it is difficult to maintain references to resources across different editions since the addresses of the other editions are not necessarily known to the edition building the request. This makes it difficult to have components of one edition, which are accessed through one gateway, access components of another edition, which are accessed through a different gateway. When the system configuration changes, for example, by adding a new gateway, all of the links to the other editions must be manually updated in the previous editions of the components. It would be advantageous for components accessed through one gateway to be able to resolve a relative address to create a request for a component accessed through another gateway.

BRIEF SUMMARY

In accordance with an embodiment of the present disclosure, there is provided a method of generating an object request comprising an absolute address from a relative address in a system comprising a plurality of editions of components for processing the object, the object request being generated by a request-building component. The method comprises determining an edition of a component associated with processing the object, determining a specified address associated with the edition, and constructing the request using the specified address.

In accordance with a further embodiment of the present disclosure, there is provided a system for generating a request comprising an absolute address from a relative address in a system comprising a plurality of editions of components for processing the object, the request being generated by a request-building component. The system comprises an object retrieval component that retrieves the object, an edition control component that determines the edition of the component associated with processing the object, and retrieves the specified address associated with the edition. The system further comprises a request builder component that constructs the request using the specified address.

In accordance with a still further embodiment of the present disclosure, there is provided a computer readable medium storing instructions or statements for use in the execution in a computer of a method of generating a request comprising an absolute address from a relative address in a system comprising a plurality of editions of components for processing the object, the request generated by a request building component. The method comprises determining the edition of the component associated with processing the object, determining a specified address associated with the edition, and constructing the request using the specified address.

BRIEF DESCRIPTION OF THE SEVERAL VIEWS OF THE DRAWINGS

Embodiments of the invention will be described with reference to the drawings in which.

DETAILED DESCRIPTION

Figure 2:
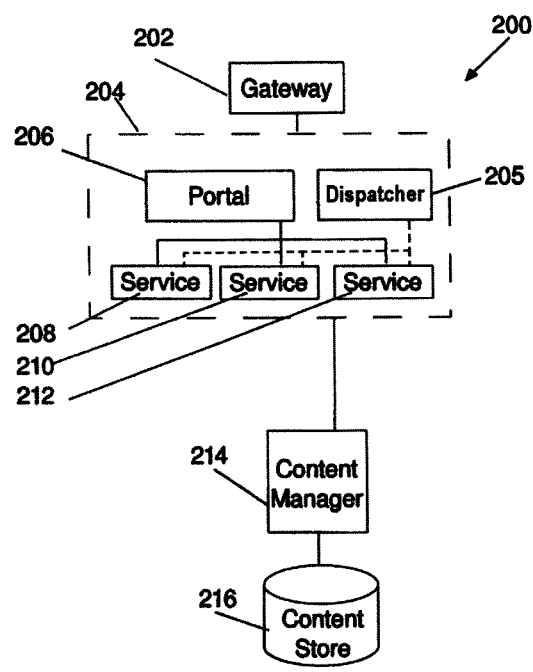
FIG. 2 depicts an exemplary environment that may be upgraded to include multiple editions of components in accordance with the present disclosure.

Referring to FIG. 2, there is shown an environment that may be upgraded to include multiple editions of components in accordance with the present invention. The environment 200 includes a gateway 202 that can provide an access point to clients (not shown) to access the components 204 of the environment. The gateway 202 may be implemented in, for example, a web server that serves web pages to the clients. The illustrative components 206,208,210,212 are accessed by the gateway 202, or more generally the web server, to build the web pages sent to the clients. The components 206,208, 210,212 may include a portal component 206 and a plurality of service components 208,210,112 that provide product functionality.

Although the service components 208, 210, 212 are depicted as being accessed through the portal component 206, it is understood that the service components 208,210,212 may also be accessed directly through the gateway. Similarly, the portal component 206 could be accessed by the service components 208, 210, 212.

The portal component 206 may be implemented as a part of a servlet, depicted by dashed line 204, with the additional components 208, 210, 212 as modules of the servlet. The servlet 204 may also include a dispatcher component 205 that routes requests to service components for processing. Alternatively, the portal component 206 and additional components 208, 210, 212 may be implemented as discrete servlets accessed through a common gateway 202.

Additional servlets 204 may be present in the environment. Each dispatcher of the servlets is able to communicate with all of the other dispatchers in the environment. As such, a request for a service component may either be routed to a service component in the servlet of the dispatcher, or it may be passed to a different dispatcher which routes the request to the service components of its servlet.

The servlets 204 may be grouped together, referred to as server groups. Grouping the servlets into server groups allows, for example, processing requests efficiently, identifying servlets that can access particular hardware or resources, as well as to support charge-back accounting.

For example, an environment may include four servlets 204 which each provide the same functionality. The servlets 204 may be grouped into two server groups. One server group may include three of the servlets 204 and is configured for processing requests from a first group of users that only have access to a subset of the information stored in the content store 216. The second server group may include the fourth servlet and has access to specialized hardware for quickly processing requests. The second server group may process requests received from users that have access to all the information stored in the content store. The appropriate server group will process a request from a user. So, requests from the second group of users will be dispatched from any of the dispatchers to the dispatcher of the second server group, which will process the request quickly using the specialized hardware and having access to all of the information in the content store. Requests received from the first group of users will be routed to the dispatchers of the first server group and processed only having access to a subset of the information stored in the content store.

A portal component of a servlet may construct a user interface (UI) using various UI components, which may be implemented in a servlet or in modules of servlets. The UI components used by a portal component when constructing the UI are commonly addressed by a URI. The URI may point to a static object handled by a web server such as an image or text file, or a dynamic object or dynamic content constructed by a service component. Service components that construct dynamic objects or content may construct the objects or content using UI components. There may be a tight coupling between service components and UI components. For example, a particular edition of a service component may expect a UI component to be located at a specific URI. The service components may be requested to construct the dynamic objects or content.

The UI constructed by the portal may be customized based on the user accessing the portal. For example, a portal web page may display different functionality that is available to the user. The different functionality is generally provided by the service components. The portal may build the request for the service component to construct a dynamic object or content. The request to the service component may be built by the portal as part of the portal web page, and sent when a user clicks a link for example. Requests generated by the portal component may use a relative URI, which are resolved relative to the gateway used by the client to access the portal.

The requests built by the portal component may include server group information for specifying a server group that should process the requests. Portal components may determine the server group information from configuration information stored in the content store and accessed using the content manager 214. This information may be stored as a collection of server group hints. When constructing a request for an object or content to be generated by a service component for a user of a particular group, the portal component can determine which server group to use when processing the request. In the example above, when a user of the second group wishes to run a report, using for example a report generating service component, the portal determines from the content manager which server group this request should be run on. The content manager 214 can be configured to determine the server group information for a request based on the object being requested, the service component required for the object, the user that is requesting the object as well as a group or groups the user belongs to. This information may be configured, for example, by an administrator of the environment. The content manager returns the server group information to the portal component, which can then build a request, for the service component to create the object or content, specifying which server group the request should be routed to by the dispatchers. As described above, all dispatchers can pass requests to all other dispatchers, so any dispatcher can receive the request and pass it to the specified server group for processing.

This tight coupling may cause a problem when multiple editions of components are present in a single environment, since if a first edition of a portal component constructs a request for a different edition of a component using a relative URI, the absolute URI will be built using the gateway address of the first edition portal, and so the service component may not be able to locate the UI components it expects to find at a location relative to a gateway for the second edition portal.

Figure 3:
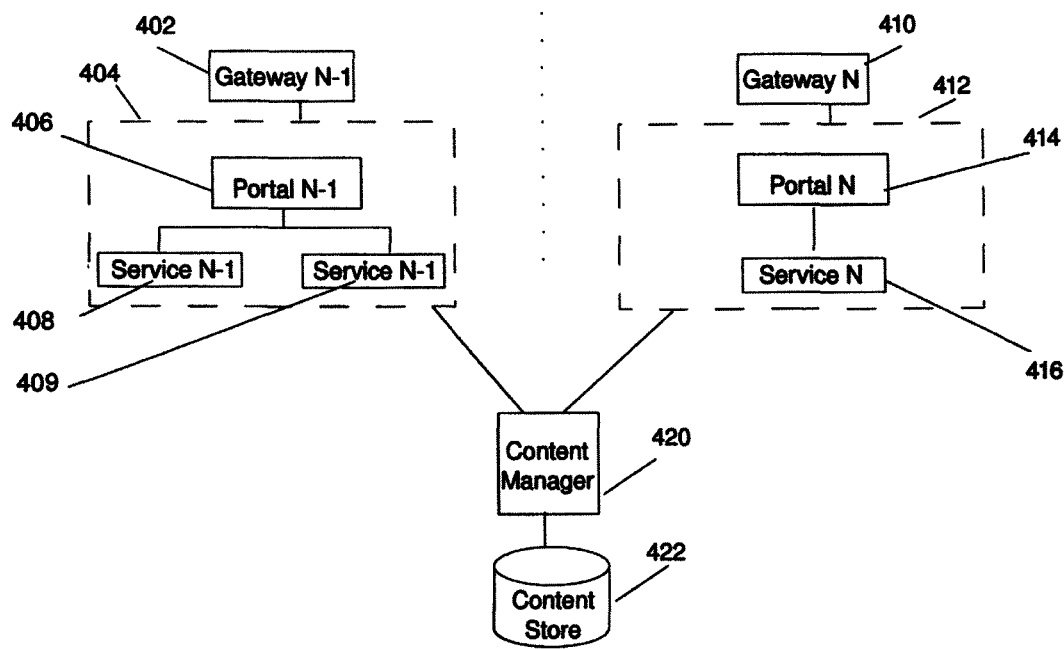
FIG. 3 depicts an exemplary environment that includes two editions of components in a single installation, in accordance with the present disclosure.

Referring to FIG. 3, there is shown an environment that includes two editions of components in a single installation in accordance with the present invention. The environment includes two gateways 402, 410 that provide access to different editions (namely N and N-1) of components that are arranged in separate server groups 404, 412. The components accessed through the first gateway comprise a portal 406 and two servlets 408, 409 that provide some functionality, for example, running a report and processing orders. The components accessed through the second gateway 410, include a portal 414 and a servlet 416 and are arranged in a separate server group 412. The components of the server groups 404, 412 are constrained to each comprise components of a single edition. The server groups 404, 412 may be located on an application server or other type of server. Although not shown in FIG. 3, the server groups also include dispatchers for dispatching requests to the appropriate components. If the server groups are also constrained to have only a single edition of components present, it is possible to determine the edition of the components used to generate the content or object of a request by determining the edition of any of the components or servlets of the server group that was determined to be used for generating the content or object of the request for a user. The edition information may then be used in constructing the request containing the appropriate URI for accessing the appropriate component or servlet edition.

Based on configuration information provided in the content store, it can be determined that when a particular user, U, requests an object or content be produced by a service component or software package P, the request for the object or content should be processed on server group S. Based on the server group determined to process the request on, the edition of the component or software package used to generate the content or object can be determined. The software packages P that are on the server groups S are constrained so that the server group contains only a single edition of software on the server group. As a result of this constraint, once the server group S, to be used when generating the content or object with the service component or software package P is determined, the edition of the component or software package P can be determined. The information may be stored in the content manager, or the edition may be requested from any of the software packages running on the server group.

Once the edition of the software package P is known, the edition information may be used by the portal component when constructing the UI or portal web page, to construct the absolute URI for a request using a specified path associated with the edition and the relative path of the software package or service component for generating the object or content.

The edition of a software package is similar to the version of the software package; however, it is a coarser level then the version. For example, the version may be related to specific build components, while the edition may be related to a particular product release. As such, issuing a hot site fix for a component might change the version of the component but wouldn't change the edition of the component.

Since some requests can be handled by the web server (or gateway), it may not be possible to redirect the request to the appropriate location when it is received, so the appropriate absolute URI for the request must be constructed when the object request is constructed as part of the UI page.

The servlet 416 may be an edition N servlet that is accessed through the edition N portal 414. In order for a client that is viewing a UI constructed by the edition N-1 portal 406 to be able to make a request to the N servlet 416, the request built by the N-1 portal must be an absolute URI. In order to build the absolute URI for the request, the N-1 portal 406 must be able to resolve a relative address of the N servlet 416 to an absolute address. However, the N servlet is accessed through the N gateway 410, whose address may not be known to the N-1 portal 406, so the N-1 portal 406 cannot build the absolute URI without further information. This further information may be the address of the N-gateway. The absolute URI for the request may then be built as the path of the N-gateway concatenated with the relative URI of the N-servlet.

When building the absolute URI for the request for an object to be processed by a different edition of a component, for example the N servlet 416, the server group 412 for processing the object is determined, for example by the content manager 420. Each server group 412,404 is restricted to comprise a single edition of components. As a result of the restriction, once the server group 412 for processing the object by the new servlet 416 is determined, it is possible to determine the edition of the N servlet 416. The edition of components may be associated with the absolute path of the edition's gateway. This information may be configured and stored in the content store, or alternatively the determined server group for processing the request may be queried to determine the edition of any of the components of the server group.

To determine the edition of the N servlet 416, the dispatcher of the server group 412 may be queried to determine its edition, which will be the same due to the single edition restriction requirement. With the edition information, the address of the N gateway 410 may be determined. This information may be stored in the content store 422 as configuration information and retrieved using the content manager 420. For example, the configuration information may specify that requests for edition N components use the location of the N gateway 410. With the specified address of the N gateway 410, the N-1 portal 406 can resolve the absolute URI from the relative URI and the N gateway address and construct the request using the absolute URI. The request is returned to the client which can access the new service 416 using the constructed request which is an absolute URI specifying the N gateway 410.

A user of an N-1 client may access the N-1 portal 406 through the N-1 gateway 402. The client accesses the N-1 portal 406, which constructs a UI page for the user of the client showing, for example, the available reports that can be run by the user. The N-1 portal 406 retrieves, for example from the content manager, objects for constructing the UI page. For example, the portal may retrieve from the content manager 420 report objects that the user is able to run. The report object may be run or processed by a service component running on a server group. The specific server group for processing an object may be based on the user requesting the object, or the user for which the portal web page is being constructed that will contain the request for the object.

In order to build the UI page, the portal creates a link for the request specifying the appropriate URI for processing the object on the determined server group. The content manager 420 determines the server group for processing an object by a user. The edition of the server group components can then be determined by querying a component of the server group for its edition. The content manager may alternatively return the edition information, so that the portal only needs to build either an absolute URI or a relative URI depending on whether the edition of the component for processing the request is different or the same from the edition of the portal component building the request for the portal web page.

Once the portal component has the edition information, it can determine the address information required to resolve a relative URI for the object into an absolute URI for the object. Alternatively, the portal component may request the gateway information for resolving the relative URI from, for example, the content manager 420. The portal 406 can then build a request URI for each object.

The portal 406 may construct all the requests as absolute URIs. However, more preferably, the portal 406 only constructs an absolute URI for requests that use a different gateway than the gateway 402 used to access the portal 406. The portal component can determine which requests require an absolute URI to be built using the specified address by checking the edition information associated with the processing of the object against its own edition information. If the edition information of the portal component 406 matches the edition information of the component for processing the object, the request may use a relative URI. However, if the edition associated with the object does not match the edition information of the portal component 406 constructing the request URI, an absolute URI request is constructed.

Once the portal component 406 has constructed the portal UI web page, including URI requests, the constructed portal web page can be returned to the client. The client can then select a request URI, which will send a request to the appropriate location, either a relative location based on the location of the UI page, or the absolute URI. The request may be received by a dispatcher of the server group, which can route the request to the appropriate component for processing.

For example, if the N-1 portal constructs a request URI for an object that is to be processed by the N servlet 416, the request URI will be an absolute URI pointing to the N gateway, which may receive the request and dispatch it to the appropriate component for processing, for example the N servlet 416 as specified in the request URI.

While the above described constructs an absolute URI request for an N edition of a component to be used in processing an object, in an N-1 portal, an absolute URI request for the N-1 edition of a component may be constructed from within the N edition portal. The portal can determine the edition of a component that is to be used to process an object. If the edition of the component for processing the object does not match the edition of the portal or if the address of the gateway used to access the object does not match the address of the gateway used to access the portal, the portal can determine the address of the gateway associated with the component edition and so resolve the relative address of the component for processing the object to the appropriate absolute address to use when constructing a request URI.

The requests have been described above as being constructed in the portal; the same approach can be used by any component in the environment to construct a UI request for an object.

Figure 1:
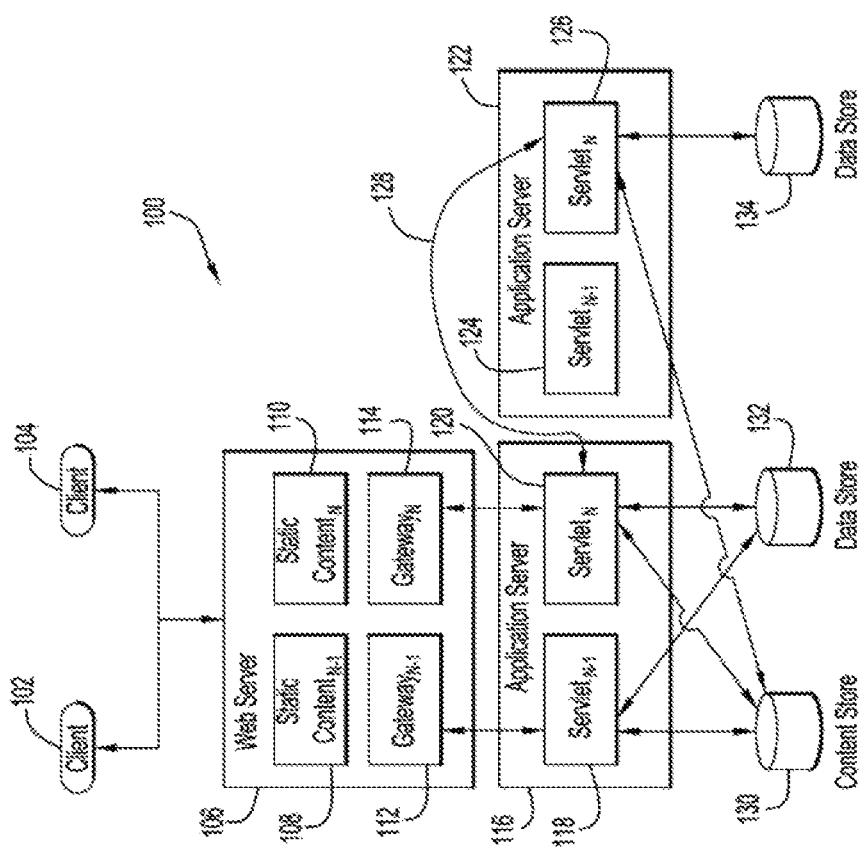
FIG. 1 depicts a typical multiple edition environment.

In order to provide the ability to have multiple editions of components function together, a way to determine the edition of a component used to process an object is required. The system as described with reference to FIG. 1 can determine a server group associated with a request through the use of hints associated with an object. This mechanism can be augmented and used to determine an edition of the component to use by enforcing the limitation that a server group only has components of a single edition. Since a request for objects can be associated with server groups, if the server groups are required to only have a single edition of components on them, the mechanism used to associate a server group with a request can be extended to associate an edition with the object. The edition information can then be associated with a specified address used to resolve the relative URI to an absolute URI. While the above has described the specified address used to resolve the relative URI as being a gateway address, it is recognized that it could be any address appropriate.

It is possible to construct a request URI for an object to be processed by a component by constructing an absolute URI request for the component to process the object using a relative URI for the component and a specified address for accessing the particular edition of the component. The specified address may be the address of a gateway used to access the component that processes the object. The specified address can be associated with edition information about the component that processes the object. The specified address and associated edition information may be stored in the content store. The edition information can be determined, by first determining the server group associated with the component for processing the object. From the server group information, and the single edition requirement of server groups, the edition can be determined from the server group. With the edition information, the specified address can be determined, for example from the content store, and the relative URI resolved to the absolute URI.

Figure 4:
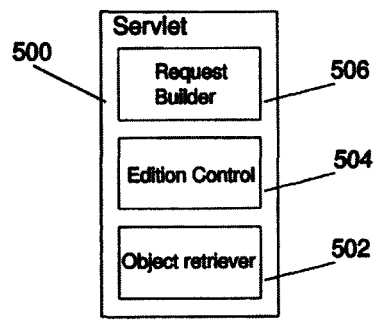
FIG. 4 depicts exemplary modules of a component for constructing an absolute address request, in accordance with the present disclosure.

Referring to FIG. 4, there is shown exemplary modules of a component for constructing an absolute address request, in accordance with the present invention. The component is depicted as a servlet 500, and may be implemented as part of the servlets or components, such as the portal. The servlet 500 includes an object retriever module 502. The object retriever module 502 retrieves objects from the content store 422 that requests are being constructed for. The servlet 500 further includes an edition control module 504. Each of the objects retrieved by the object retriever module 502 that require processing by a component or servlet (for example, a report object is processed by a report generating servlet) include a server group as determined by the content manager 422. The edition control module 504 determines the edition associated with each object. To determine an object's edition, the edition control module 504 may query a component of the determined server group for its edition. Alternatively, the object retriever module 502 may determine the edition information. If the object retriever module determines the edition information, the edition control module 504 may be included as part of the object retriever module. The servlet 500 further includes a request builder module 506 for constructing a request for the client to access the object. The servlet's request builder module 506 determines if the determined edition of the object matches that of the servlet 500. If the editions match, then the request is constructed as a relative address or URI, meaning that the object will be accessed through the gateway used to access the Servlet 500. If the edition of the object and the servlet 500 do not match, then the request builder module 506 constructs the request as an absolute address or URI. In order to resolve the relative address to an absolute address, it is necessary to store a specified address, such as a gateway address, associated with the edition. This information can be stored in the content store and accessed by the request builder module 506. The request builder module 506 can build a web page that includes the constructed request. Additionally or alternatively, the request builder module 506 may return the constructed request to another component for further processing.

Figure 5:
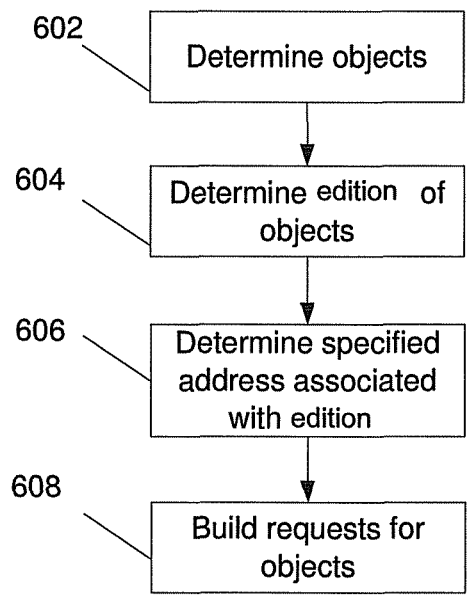
FIG. 5 shows in a flow chart an exemplary method for a servlet to build requests for objects in a system with multiple editions of components, in accordance with the present disclosure.

Referring to FIG. 5, there is shown a method for a servlet 500 to build requests for objects in a system with multiple editions of components. The method begins by the servlet 500 retrieving objects (602). The objects are retrieved from the content store 422 using the content manager 420 and may include objects to be processed by servlets. The servlet 500 then determines an edition of the servlet for processing each object (604). As previously described, the edition, as determined through the server group, may differ depending on the user for which the request is being built for, as well as any groups the user may belong to. With the edition of the servlets for processing the objects determined, the servlet 500 determines a specified address associated with the edition (606). The servlet 500 then constructs a request for each of the objects (608) using the specified address.

Figure 6:
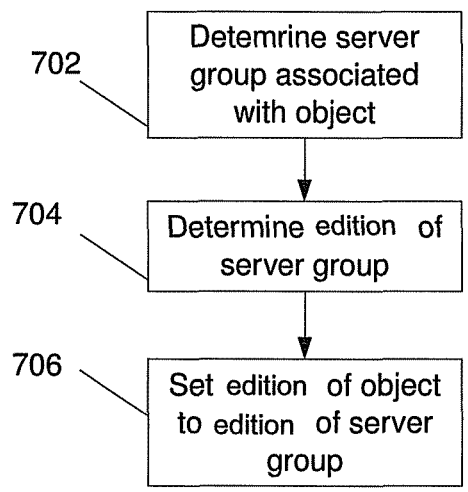
FIG. 6 shows in a flow chart an exemplary method for determining the edition of an object, in accordance with the present disclosure.

Referring to FIG. 6, there is shown a method for determining the edition of an object. The method begins by determining the server group associated with the object (702). The edition of the server group is determined (704), and the edition of the server group is set as the edition of the object (706).

Figure 7:
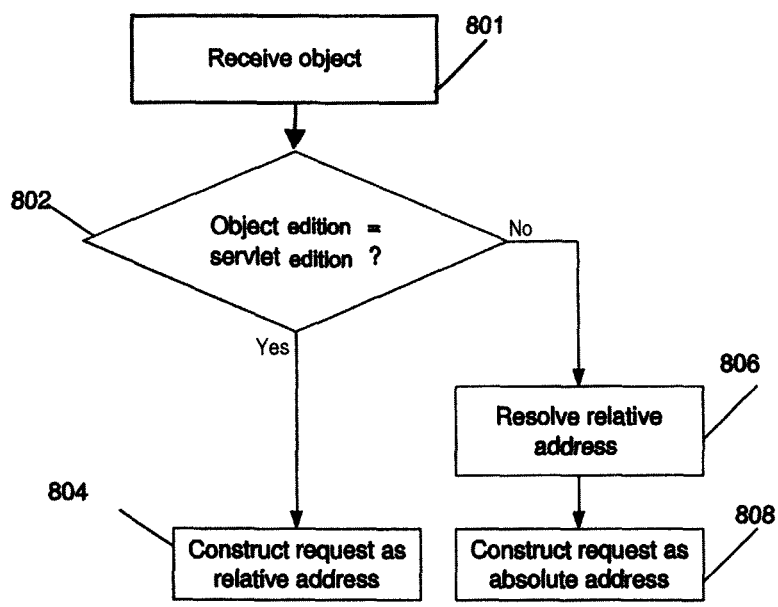
FIG. 7 shows in a flow chart an exemplary method for constructing a request for an object, in accordance with the present disclosure.

Referring to FIG. 7, there is shown a method for constructing the request for an object. The method receives an object (801) for which the request is being constructed and checks to see if the edition associated with the object matches the edition of the servlet (802). If the editions match (Yes at 802), the request is constructed as a relative address (804). If the editions do not match (No at 802), the method resolves the relative address to an absolute address using the specified address associated with the edition (806). The method constructs the request using the resolved absolute address (808).

The system and method described above provides support for multiple editions of components to be used and to reference each other. The system and method may use the routing of requests to server groups in combination with edition configuration information that defines a configuration data structure for each software edition to allow requests from other editions to be sent to components in that edition. The configuration information includes a virtual directory, or relative address, a specified address or gateway address, and an edition identifier. By determining an edition associated with an object, the relative address for requesting the object can be resolved using the configuration information. If the edition information is to be associated with objects using the server group request routing information, the components on a server group must be limited to a single edition.

The above has described determining the edition information associated with an object by determining the edition information of the server group associated with the object. It is possible to determine the edition information associated with an object in various ways. For example, the hints used to determine the server group of objects can be augmented to include, not only the server group information, but also the edition information. Alternatively, the object may be decorated with the edition information. This may relax the requirement that a server group have only a single edition; however, it may require additional effort in maintaining the locations for accessing the different editions; however, the runtime requirements for routing requests to the proper edition of a component may be more demanding.

As described above, components may construct a UI request for objects based on the edition of the servlet that processes the object. The URI request can be constructed by a component of one edition and request an object that is processed by a component of a different edition. For example, an N-1 edition portal may construct a request for a report that is processed by an N edition report-generating component instead of an N-1 edition of the report-generating component. Advantageously, this allows old editions of components to be migrated to new editions individually without requiring all components be the same edition. For example, a system may comprise a portal that creates a UI for accessing a report generating servlet and an order processing servlet. A new edition of the report generating servlet may be used by modifying the configuration information of the system to specify that certain requests for the report-generating component should be processed by a specific server group. Furthermore, since the server group used to process an object can be specified for different users or groups of users, it is possible to configure the system to process report requests from a particular group of users using the new edition, and requests from other users using the older edition. For example, a new edition may be deployed to a small group of users in a test group to ensure it is functioning correctly before being used by all users.

Additionally, if gateways are arranged in a parallel configuration system wide, a relative path can be used to jump between gateways. For example, if two parallel gateways have paths http://example.com/VN-1 and http://example.com/VN, then the system can be configured to use the . . . /VN path to jump from the N-1 gateway to the N gateway. Likewise, the . . . /VN-1 path to jump from the N gateway to the N-1 gateway.

The above description has referred to the edition of components. The edition information may be made as fine or coarse as required for the application. For example, it may be a version number, which reflects specific builds of components, or it could also cover a set of versions as described above.

Figure 8:
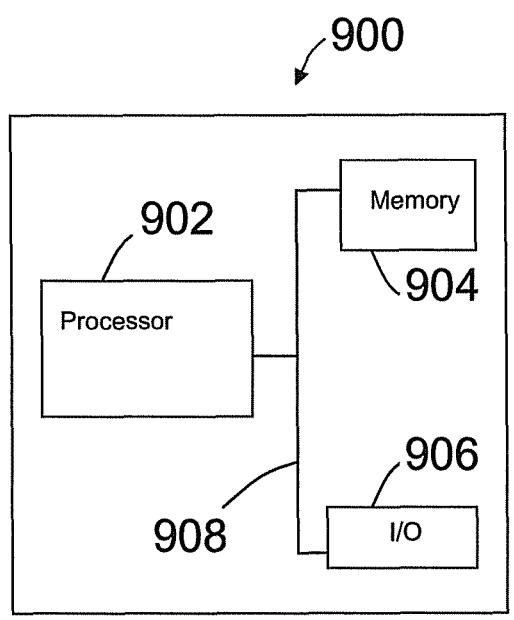
FIG. 8 depicts in a block diagram, illustrative components of a computer that may be used to implement the system and method described herein.

FIG. 8 depicts in a block diagram, illustrative components of a computer that may be used to implement the system and method described herein. The computer 900 comprises a processor 902 operationally coupled to a memory 904. The processor 902 may also be operationally coupled to one or more input/output (I/O) devices 906. The processor 902 may be coupled to either the memory 904 and/or the I/O device 906 by one or more buses 908.

The processor 902 may be a central processing unit (CPU), a microprocessor, an application specific integrated circuit (ASIC), a field programmable gate array (FPGA) or other type of processor capable of executing instructions. The processor may include the hardware and controlling code such as firmware or basic input/output system (BIOS) used to configure the processor 902 and other components of the computer 900. The processor 902 may be implemented in one or more physical packages. Each package may include one or more processor cores for executing instructions.

The memory 904 may include different levels of memory, including both volatile and non-volatile memory for storage of information. The memory 904 may include, for example, registers for storing instructions to be executed by the processor 902, flash memory, electrically erasable programmable read only memory (EEPROM), random access memory (RAM), hard disk drives (HDD), solid state drives (SSDs), or other types of devices for storing information. The memory 904 may store the instructions to be executed by the processor to provide the system and method described herein. The instructions may be stored in different levels of the memory at the same time. For example, an instruction may be copied from a HDD to RAM to a register of the processor 900 prior to being executed by the processor 900. The results of processing the instruction or instructions may be stored in memory 904. Storing the instructions of the system and method described herein in the memory 904 alters one or more characteristics of the memory, such as the electrical characteristics of one or more cells of the memory 904.

The I/O devices 906 may include input and output devices. Input devices may include devices for inputting information to the computer 900, for example, mice, keyboards, keys, switches, cameras, scanners, microphones, touch panels or screens, or other input devices as known by one of ordinary skill in the art. The output devices may display or convey information and may include for example monitors, televisions, Braille devices, lights, printers, speakers, actuators and other output devices as known by one of ordinary skill in the art.

The buses 908 may include one or more buses for connecting the memory 904 and I/O devices 906 with the processor, or each other. The buses may be internal or external buses and may include the physical connectors required to connect components to the buses 908. Different buses are known, and may include for example peripheral component interconnect (PCI), PCI express (PCIe), industry standard architecture (ISA), advanced technology attachment (ATA), serial ATA (SATA), small computer system interface (SCSI), universal serial bus (USB), IEEE 1394 (FireWire™). The buses may also include buses for controlling the computer such as a front side bus (FSB), address bus, or control bus.

As will be appreciated by one skilled in the art, the present invention may be embodied as a system, method or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product embodied in any tangible medium of expression having computer usable program code embodied in the medium.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a transmission media such as those supporting the Internet or an intranet, or a magnetic storage device. Note that the computer-usable or computer-readable medium could even be paper or another suitable medium, upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wire line, optical fiber cable, RF, etc.

Computer program code for carrying out operations of the present invention may be written in any combination of one or more programming languages, including an object oriented programming language, such as Java, Smalltalk, C++ or the like and conventional procedural programming languages, such as the "C" programming language or similar programming languages. The program code may execute entirely on the user's computer, partly on the user's computer, as a standalone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present invention has been described above with reference to flowchart illustrations and/or block diagrams of methods, systems and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical functionality. It should also be noted that, in some alternative implementations, the functionality noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functionality or acts, or combinations of special purpose hardware and computer instructions.

What is claimed is:

1. A computer-implemented method comprising:
   determining via a computer processor an edition of a first component accessible via a first network device and associated with processing an object within a system comprising a plurality of different editions of components;
   comparing via a computer processor said edition of said first component to an edition of a second component accessible via a second network device and associated with constructing an object request for processing the object by the first component, wherein components of different editions are accessible via respective network devices with different network addresses; and
   responsive to a determination that said determined edition of said first component is different than the edition of the second component:
      resolving via a computer processor a relative address of said first component to an absolute address based on a network address of the first network device;
      constructing said object request for said first component via said second component using said absolute address; and
      routing using a computer network said object request through said first network device to said first component to process said object.

2. The computer-implemented method as claimed in claim 1, wherein determining said edition comprises:
   determining a server group associated with said object;
   determining an edition of said server group associated with said object; and
   setting said edition of said first component associated with said object to said edition of said server group.

3. The computer-implemented method as claimed in claim 2, wherein said server group comprises a single edition of components.

4. The computer-implemented method as claimed in claim 3, wherein determining said edition of said server group comprises querying a dispatcher of said server group for an edition of said dispatcher.

5. The computer-implemented method as claimed in claim 1, wherein determining said edition comprises:
   determining if said edition of said first component matches an edition of said second component.

6. The computer-implemented method as claimed in claim 1, wherein a specified address for said first component used to determine said absolute address and associated edition information are stored in a content store.

7. The computer-implemented method as claimed in claim 1, wherein said relative address is based on an address of a gateway for accessing components of a single edition, said gateway address being different from a gateway address for accessing said second component constructing said object request.

8. A system comprising:
   at least one computer processor configured to:
      determine an edition of a first component accessible via a first network device and associated with processing an object within said system comprising a plurality of different editions of components;
      compare said edition of said first component to an edition of a second component accessible via a second network device and associated with constructing an object request for processing the object by the first component, wherein components of different editions are accessible via respective network devices with different network addresses; and
      responsive to a determination that said determined edition of said first component is different than the edition of the second component:

resolve a relative address of said first component to an absolute address based on a network address of the first network device;

construct said object request for said first component via said second component using said absolute address; and route using a computer network said object request through said first network device to said first component to process said object.

9. The system as claimed in claim 8, wherein determining said edition comprises:

determining a server group associated with said object from a content store;

determining an edition of said server group associated with said object; and setting said edition of said first component associated with said object to said edition of said server group.

10. The system as claimed in claim 9, wherein said server group comprises a single edition of components.

11. The system as claimed in claim 10, wherein determining said edition of said server group comprises querying a dispatcher of said server group for an edition of said dispatcher to determine said edition of said server group.

12. The system as claimed in claim 8, wherein determining said edition comprises:

determining if said edition of said first component matches an edition of said second component.

13. The system as claimed in claim 8, wherein a specified address for said first component used to determine said absolute address and associated edition information are stored in a content store.

14. The system as claimed in claim 8, wherein said relative address is based on an address of a gateway for accessing components of a single edition, said gateway address being different from a gateway address for accessing said second component constructing said object request.

15. A computer program product comprising:

a computer readable memory device storing computer readable program code, the computer readable program code comprising computer readable program code configured to:

determine an edition of a first component accessible via a first network device and associated with processing an object within a system comprising a plurality of different editions of components;

compare said edition of said first component to an edition of a second component accessible via a second network device and associated with constructing an object request for processing the object by the first component, wherein components of different editions are accessible via respective network devices with different network addresses; and responsive to a determination that said determined edition of said first component is different than the edition of the second component;

resolve a relative address of said first component to an absolute address based on a network address of the first network device;

construct said object request for said first component via said second component using said absolute address; and route using a computer network said object request through said first network device to said first component to process said object.

16. The computer program product as claimed in claim 15, wherein a specified address for said first component used to determine said absolute address and associated edition information are stored in a content store.

17. The computer program product as claimed in claim 15, wherein said relative address is based on an address of a gateway for accessing components of a single edition, said gateway address being different from a gateway address for accessing said second component constructing said object request.

18. The computer program product as claimed in claim 15, wherein determining said edition comprises:

determining a server group associated with said object;

determining an edition of said server group associated with said object; and setting said edition of said first component associated with said object to said edition of said server group.

19. The computer program product as claimed in claim 18, wherein said server group comprises a single edition of components.

20. The computer program product as claimed in claim 19, wherein determining said edition of said server group comprises querying a dispatcher of said server group for an edition of said dispatcher.

* * * * *